United States Patent [19]

Mori

[11] 4,241,948
[45] Dec. 30, 1980

[54] DEVICE FOR LOCATING GUIDE RAIL FOR SLIDABLE VEHICLE ROOF PANEL

[75] Inventor: Keizi Mori, Toyota, Japan

[73] Assignee: Aisin Seiki Kabushiki Kaisha, Kariya, Japan

[21] Appl. No.: 955,214

[22] Filed: Oct. 27, 1978

[30] Foreign Application Priority Data

Oct. 29, 1977 [JP] Japan ................................ 52/145268

[51] Int. Cl.³ .............................................. B60J 7/04
[52] U.S. Cl. ........................................ 296/216; 403/13
[58] Field of Search ....................... 296/137 E, 137 F; 403/13, 14, 106, 376, 377, 380; 160/188

[56] References Cited

U.S. PATENT DOCUMENTS

| 2,231,297 | 2/1941 | Saxe | 403/13 |
| 3,044,825 | 7/1962 | Golde | 296/137 E |
| 3,097,729 | 7/1963 | Saxe | 403/13 |
| 3,290,087 | 12/1966 | Werner | 296/137 E |

FOREIGN PATENT DOCUMENTS 612620 11/1948 United Kingdom ..................... 403/380

Primary Examiner—David M. Mitchell
Attorney, Agent, or Firm—Finnegan, Henderson, Farabow, Garrett & Dunner

[57] ABSTRACT

A device for locating a guide rail for a slidable vehicle roof panel in which a substantially bayonet-point-like plate member protrudes from the end of a rail disposed from a roof opening in the direction of the sliding movement of the slidable roof panel, a clip having a through hole for receiving said bayonet-point-like plate and adapted to be mounted on a housing defining a space for containing said slidable roof panel being provided, and said through hole being provided with an inclined surface provided on the lower portion of the inlet side by which said bayonet-point-like plate is guided into said through hole.

2 Claims, 4 Drawing Figures

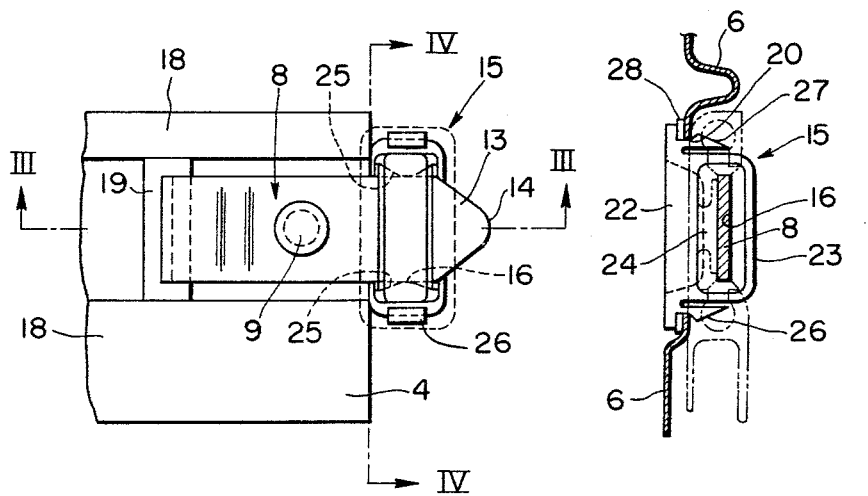
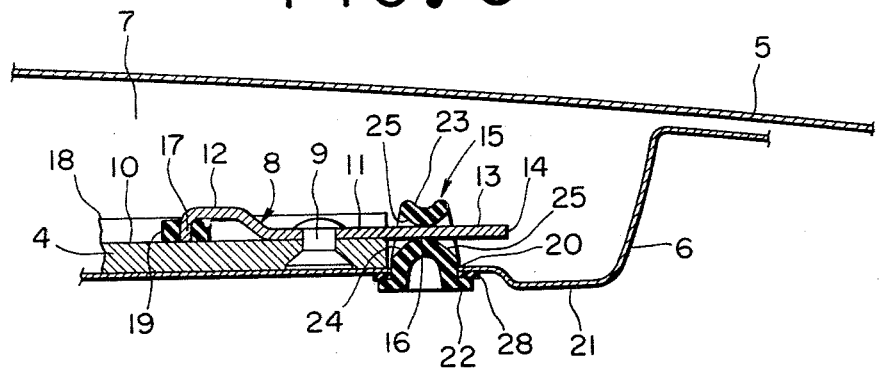

DEVICE FOR LOCATING GUIDE RAIL FOR SLIDABLE VEHICLE ROOF PANEL

BACKGROUND OF THE INVENTION

This invention relates to a device for locating a guide rail for a slidable vehicle roof panel.

A slidable roof panel has been provided on a vehicle for closing and opening an opening formed in its fixed roof. Such a slidable roof panel can be slid along a pair of rails provided on opposite sides of the opening of the vehicle roof to extend in the longitudinal direction thereof thereby closing and opening the opening. A slidable panel of this kind is contained in a space provided within the roof when it is desired to open the opening of the vehicle roof, and said space is defined by the fixed roof and an inner panel secured thereto to have a volume sufficient to locate the pair of rails and permit the slidable movements of the roof panel into and out of the space.

Hitherto, it has been proposed that a pair of longitudinally extending and laterally spaced bars is provided on the rear end of each of the rails and the bars are inserted into mating holes formed in the inner panel to locate the rails within the roof. Such insertion of the bars into the holes is achieved by inserting the rail through the opening of the roof into the space and trying to allow the bars to be brought into registration with the respective holes depending upon the operator's intuition, because the holes can not be perceived by the operator's eye. Therefore, such operation is extremely inefficient and requires a relatively long working time.

SUMMARY OF THE INVENTION

Therefore, an object of the present invention is to provide a device for locating a guide rail for a slidable vehicle roof panel in which the above-mentioned drawbacks of the conventional arrangement are removed and the rail can be easily affixed to the vehicle roof.

BRIEF DESCRIPTION OF THE DRAWINGS

FIG. 2 is a plan view of an embodiment of the device of the present invention;

FIG. 3 is a section taken along a line III—III shown in FIG. 2; and

FIG. 4 is a section taken along a line IV—IV shown in FIG. 2.

DESCRIPTION OF THE PREFERRED EMBODIMENT

Figure 1:
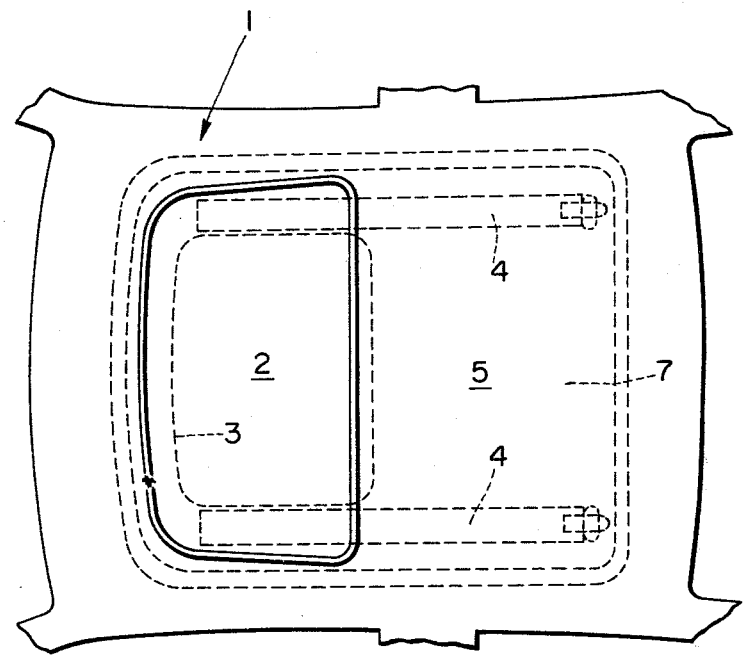
FIG. 1 is a plan view of the roof of a vehicle in which the device for locating a guide rail for a slidable vehicle roof panel of the present invention can be incorporated.

Referring first to FIG. 1, there is shown a roof 1 of a vehicle with a slidable roof panel 2 closing an opening 3 formed in the roof 1. The slidable roof 2 can be slidably moved by a suitable driving device (not shown) along a pair of guide rails 4 spaced away from each other and extending longitudinally along the vehicle adjacent to the opening, into a space 7 defined within the interior of the roof 1 by a roof panel 5 and an inner plate or housing 6 (refer to FIG. 3), thereby opening the opening 3. Each of the rails 4 may be of a kind made of an aluminium alloy material and shaped by extrusion to have a suitable cross-section as is known in the art.

As is shown in FIGS. 2 and 3, the rearward end of each of the rails 4 is fixed with a stop plate 8 by a fitting, such as a rivet 9. The stop plate 8 comprises a first flat portion 11 longitudinally extending on an upper flat surface 10 of a substantially central portion of the rail 4 and a second portion 12 formed integrally with the first portion but positioned at a level upward thereof as viewed in FIG. 3. An outer end portion of the first portion 11 protrudes outwardly from the end of the rail and is shaped like the point of a bayonet as is seen in FIG. 2. An apex 14 of the bayonet-point-like portion 13 is preferably formed to be substantially positioned on the center line. The length of the protruding end portion and the size of the bayonet-point-like portion 13 are determined in consideration of the width of a clip 15 described below and the dimension of a through hole 16 formed therein.

Formed on the free end of the second portion 12 of each of the stop plates 8 is a retaining portion 17 which is held in a resilient member 19 laterally extending between opposed shoulders 18 of the rail defining the flat surface 10. With this arrangement, the resilient member 19 is retained between the opposed shoulders 18 by the retaining portion 17 of the stop plate. In the embodiment shown, the retaining portion 17 is inserted into the central portion of the resilient member 19, but the resilient member may be bonded by adhesive to the outer surface of the retaining portion. The retaining portion 17 and resilient member 19 act to limit the movement of the slidable roof panel 2 when the latter is slid along the rails 4 to open the opening 3 of the roof.

Provided in the housing 6 defining the space 7 within the roof is a pair of apertures 20 through which a pair of clips 15 is inserted from the inside of the vehicle. Each of the clips 15 comprises a base portion 22 abutting against the outer surface 21 of the housing 6 and a body portion 23 positioned with the interior of the housing or the space 7.

Formed centrally in the body portion 23 of each of the clips 15 is a through hole 16 adapted to receive the bayonet-point-like portion 13 of the stop plate 8, the through hole having dimensions equivalent to the width and thickness of the extruded portion of the first portion 11 such that when the extruded portion of the plate 8 is inserted into the hole 16 they are brought into sliding engagement with each other. The hole 16 is provided with at least a surface 24 outwardly and downwardly inclined as viewed in FIG. 3. When the rail 4 is obliquely inserted through the roof opening 3 into the space 7 to be mounted therein, the apex 14 of the bayonet-point-like portion 13 of the stop plate 8 secured to the rail 4 comes in contact with the inclined surface 24 and is guided by it to pass through the hole 16. Since the contact of the portion 13 with the surface 24 is easily perceived by the operator, the portion 13 when moved upwardly along the surface 24 can easily be inserted into the hole 16. Preferably, the hole is formed on its four sides with outwardly divergingly inclined surfaces 25 as seen in FIGS. 3 and 4. With this arrangement, when the bayonet-point-like portion 13 of the stop plate 8 comes in contact with any of the inclined surfaces during the rail mounting operation the portion 13 of the plate 8 can easily be guided into the hole 16 to further facilitate the rail mounting operation.

Preferably, the clip 15 is intergrally formed with a pair of spaced hook pieces 26 which, as shown in FIG. 4, project from the base portion 22 and together with hook portions 27 engage the side wall portions defining the apertures 20 of the housing 6. With such an arrangement, the clip 15 is firmly fixed to the housing 6. Furthermore, the longitudinally and laterally symmetrical configuration of the clip 15 having no specific fitting direction can provide easy fitting thereof.

When it is desired to fix the rails 4, each of the clips 15 is inserted from the interior of the housing 6 into the respective aperture 20. At this time, the hook piece 26 is engaged with the housing 6 to ensure the fixation of the clip 15 to the housing 6. Each of the rails 4 fixed with the stop plates 8 is inserted through the opening 3 into the space 7 in such a manner that the apex 14 of the bayonet-point-like portion 13 comes in contact with the inclined surfaces 24, 25, thereby inserting the portion 13 into the through hole 16 and thus the end of the rail 4 is secured to the housing 6, in such a way that it may easily be released. The configuration of the portion 13 of the stop plate 8 and the surfaces 24, 25 of the clip 15 makes it very easy to insert the portion 13 into the hole 16. Since each of the surfaces 24, 25 has a relatively large area in comparison with small end area of the apex 14, contact is very easy. In addition, the surfaces 24, 25 narrow into the hole 16 and thus the apex 14 of the stop plate 8 can be guided along the surfaces 24, 25 to the hole 16 and the insertion of the plate 8 into the hole 16 is very easy.

It will be understood that such insertion is easy in comparision with the conventional device, in which as described hereinabove the pair of bars secured to the rail must be inserted into the pair of holes formed in a stepped portion of the housing, thus making it very difficult to insert the bars into the holes and requiring a relatively long working time, because there is no provision of any guide surface. On the contrary, in the device of the present invention, no pair of members is provided and a small surface is in contact with a larger reception surface which serves as a guide surface and thus the rails can be positively and rapidly fixed to the housing. Moreover, in the embodiment described the bayonet-point-portion is formed on the stop plate. However, but the bayonet-point-portion is not necessarily formed on the stop plate, but may be provided on a separate member other than the stop plate to be protruded from the rail end, and there will be no difference in the function.

Further, seal member 28 may be located between the base portion 22 of the clip 15 and the housing 6 to hold the space in fluid tight condition.

I claim:

1. Apparatus for positioning a guide rail adapted to support a slidable roof panel within a housing secured to a vehicle roof, comprising:
   (a) a plate member secured to the guide rail and extending from one end thereof, said plate member having its free end tapered to a bayonet-point-like apex, with said apex being aligned substantially parallel to the centerline of said guide rail; and
   (b) a clip member mounted through an opening in said housing and having a hole extending therethrough of substantially the same width and thickness as said plate member, said hole being adapted to receive said plate member for releasably securing said guide rail to said housing, said clip member having at least one inclined surface leading to said hole for guiding said tapered end of the plate member into said hole, and said clip member having at least one hook piece for engaging the edge of said opening.

2. The apparatus of claim 1 in which convergingly inclined surfaces are provided on the periphery of said hole for facilitating entry of said tapered apex.

* * * * *